United States Patent [19]
Berscheid

[11] Patent Number: 5,794,713
[45] Date of Patent: Aug. 18, 1998

[54] UNIVERSAL HUB ASSEMBLY

[75] Inventor: Clint Berscheid, Humboldt, Canada

[73] Assignee: Ron Lefevre, Saskatoon, Canada

[21] Appl. No.: 698,426

[22] Filed: Aug. 15, 1996

[51] Int. Cl.[6] ........................................ A01B 5/00
[52] U.S. Cl. .................. 172/518; 172/776; 301/105.1; 301/111
[58] Field of Search ................... 172/518, 540, 172/776; 111/52; 403/1; 301/105.1, 64.7, 111, 110.6, 112, 126, 131, 106

[56] References Cited

U.S. PATENT DOCUMENTS

| | | | |
|---|---|---|---|
| 67,513 | 8/1867 | Dodge | 301/131 X |
| 366,760 | 7/1887 | Candee | 301/105.1 X |
| 1,259,269 | 3/1918 | Murray | 301/105.1 |
| 1,821,829 | 9/1931 | Coe et al. | 301/126 X |
| 1,876,749 | 9/1932 | Rea | 301/111 X |
| 2,189,464 | 2/1940 | Frisbie | 301/111 X |
| 2,201,243 | 5/1940 | Perkins | 301/111 |
| 2,204,490 | 6/1940 | Harris | 301/126 X |
| 2,211,906 | 8/1940 | Mowry | 301/111 X |
| 2,349,220 | 5/1944 | Eksergian | 301/105.1 |
| 2,406,553 | 8/1946 | Mader | 301/105.1 X |
| 2,559,975 | 7/1951 | Lange et al. | 301/105.1 X |
| 2,698,565 | 1/1955 | Carney | 111/52 |
| 2,940,781 | 6/1960 | Erikson | 301/111 |
| 2,978,277 | 4/1961 | Gaudry | 301/111 |
| 3,033,135 | 5/1962 | Gouin | 111/52 |
| 3,638,352 | 2/1972 | Christiansen | 301/112 X |
| 4,900,095 | 2/1990 | Brubaker | 301/64.7 |
| 5,143,427 | 9/1992 | Dick | 301/111 |
| 5,281,004 | 1/1994 | O'Leary, Jr. | 301/105.1 |
| 5,494,339 | 2/1996 | Johnson et al. | 301/105.1 |
| 5,603,555 | 2/1997 | Dickey et al. | 301/111 |
| 5,657,707 | 8/1997 | Dresher et al. | 172/540 X |

FOREIGN PATENT DOCUMENTS

| | | | |
|---|---|---|---|
| 551867 | 1/1958 | Canada | 301/105.1 |
| 628786 | 10/1961 | Canada | 301/64.7 |
| 1266586 | 3/1990 | Canada . | |
| 2076481 | 2/1993 | Canada | 301/105.1 |
| 2092465 | 9/1994 | Canada . | |
| 3003698 | 8/1981 | Germany | 301/105.1 |

*Primary Examiner*—Terry Lee Melius
*Assistant Examiner*—Victor Batson
*Attorney, Agent, or Firm*—Jones, Tullar & Cooper, P.C.

[57] ABSTRACT

A hub that has universal application for use with a rotatable body, such as a packer wheel for seed planting, includes a flange which abuts a side wall of the body, a non-circular or polygonal boss that projects laterally from an inner side of the flange, and a bore that extends through the hub along the rotation axis. The non-circular shape of the boss prevents relative rotation between the hub and the body. The bore is generally cylindrical to receive a cylindrical shaft but it is also provided with generally V-shaped corners cut into the bore surface so that the bore can receive a rectangular shaft to which the hub is thereby locked for rotation therewith. The end face of the boss is provided with a projecting pin diametrically opposed from a similarly shaped recess such that the pin and recess of one hub can mate with the recess and hub respectively of another hub to achieve an aligned hub assembly for mounting a wide rotating body.

15 Claims, 3 Drawing Sheets

UNIVERSAL HUB ASSEMBLY

The present invention relates to rotatable equipment in general and to a universal hub for such rotating equipment in particular.

BACKGROUND OF THE INVENTION

Prairie farmers have, for many years, packed the soil after planting in order to improve germination of the seed and emergence of the plant. Packing is usually effected by way of a wheel which is towed behind the planting equipment, the wheel being loaded so as to apply a downwardly directed force on the soil behind the planter. The packer wheel may be positioned directly in line with the planter so as to pack the soil directly above the planted seeds or it may be positioned to one side of the planting line so as to pack the soil adjacent the planting line. With wide planting equipment used on the prairies there will typically be one packer wheel associated with each seeder shank or coulter although different manufacturers may position their components as the best see fit.

There are different packer wheel constructions available, each having its own advantages and disadvantages. The three types of packer wheel presently dominating the market are the all-steel wheel, the rubber rimmed wheel, and the plastic wheel. The steel wheel is used in applications where the land is very rocky, or the loading on the packer wheel is high; this is also the most expensive wheel available. The rubber rimmed wheel may be similar to a conventional automotive tire or it may involve a metal wheel body having a solid rubber band around the periphery. These wheels are commonly used where the soil has a strong clay content and would tend to stick to rigid wheels. The rubber rimmed wheel is also expensive and requires additional assembly steps during manufacture. The plastic wheel is becoming very common as it is economical to produce and it is also durable. The body and the operating periphery of the plastic wheel are moulded of the same material and hence such wheels have a solid and rigid periphery.

A new type of plastic packer wheel is described and claimed in the commonly owned patent application of Ron R. Lefebvre entitled "Active Face Packer Wheel" and filed concurrently herewith. That packer wheel provides a flexible peripheral wall that is created by a plurality of circumferentially spaced slots which extend from the peripheral wall inwardly of the wheel body so as to define a fin member between adjacent slots. The fin members essentially are cantilevered at the root thereof so that as the wheel rotates they will flex and any soil, mud, or clay that builds up thereon during the packing operation breaks away as the wheel periphery flexes.

A common feature of all packer wheels, and of all rotating equipment, is the hub which mounts the wheel or the equipment to the shaft on which it rotates. The hub might be fixed to the shaft so that the wheel rotates as the shaft rotates. Alternatively, the shaft might be fixed against rotation, with the hub journaled to the shaft so that the wheel itself will rotate on the shaft even though the shaft is held against rotation. The latter would be a so-called free-wheeling element while the first would be a driven element.

Typical hubs presently used are integrally moulded or incorporated into the wheel which means that they cannot be re-used or changed should the packer wheel wear out. In plastic wheel manufacture the hub is usually moulded integrally with the wheel. The plastic forms around a flanged metal core. The flanges extend into the body of the wheel and provide additional support for the hub. In some instances a bearing is inserted into the centre of the wheel and side plates hold the assembly together. Replacement of the bearing is tedious and uniform distribution of the load into the body of the wheel is difficult. Lateral loads can cause unnecessary deflection in the bearing and premature wear can result. In the event that a changeover in the style of wheel is required, or if the wheel wears out, the user is required to remove the entire wheel and hub, and in many cases an entire gang of packer wheels. Often the entire wheel is discarded with little effort made to recycle any of the components thereof, except perhaps for the bearing. There is therefore a need for a hub for a packer wheel and other rotatable equipment which need not be integrally formed with the wheel or other equipment, that can be readily secured to the wheel or to a shaft, which can be used with shafts of different cross-sections, and which can also receive bearing assemblies for independent "free-wheeling" operation.

SUMMARY OF THE INVENTION

The present invention provides a hub for a packer wheel, and for other rotatable equipment, that enables a single wheel or a ganged set to be changed, that permits a quick changeover from one style of wheel to another, that permits worn or damaged plastic wheels to be recycled, that reduces wheel stresses and excessive loading at the centre of the hub, that prevents the wheel from turning on the hub, and that has other advantages that will become apparent hereinafter.

The hub of the present invention includes a flange portion, a boss portion projecting laterally from one side of the flange portion, and a central bore extending through the flange and boss portions along the axis of the hub. The boss portion has a non-circular, preferably polygonal, periphery so that it can be moulded or inserted into a plastic wheel without any fear of relative rotation between the hub and the wheel. The flange preferably includes circumferentially spaced bores therethrough to accept threaded screws or bolts to more positively secure the flange portion to the wheel body or to attach a pair of flange portions together. The boss portion is slightly tapered with the side walls thereof converging to a generally flat end face which has diametrically opposed means for aligning a pair of hubs which might be used with a wide wheel. The aligning means may include a tapered pin or dowel which projects from the end face of the boss portion and a mating counterbore which can receive the pin of the mating hub. The axial bore through the hub may have a circular cross-section to receive a cylindrical shaft but it also may have axially extending corners formed therein so that it can alternatively receive a rectangular or a square shaft. Thus the hub of this invention is extremely versatile and provides considerable benefits to the farmer.

Broadly speaking, therefore, the present invention provides a hub for use with a body rotatable about an axis, comprising: a flange portion for abutment against a side wall of the body; a boss portion projecting laterally from one side of the flange portion and receivable within the body, the boss portion having a non-circular peripheral surface; and a bore extending through the flange and boss portions along a hub axis coinciding with the axis of the body, the bore being adapted to receive shafts of different cross-sectional configurations.

The present invention also contemplates replacement packer wheels or other rotatable bodies which have a center section adapted to accept the hub of this invention. Since it is likely that the operating wheel will wear out before the hub it is expected that there could be a large market for replacement wheels that will work with the hub and which might be bought separately therefrom.

DESCRIPTION OF THE PREFERRED EMBODIMENT

Figure 1:
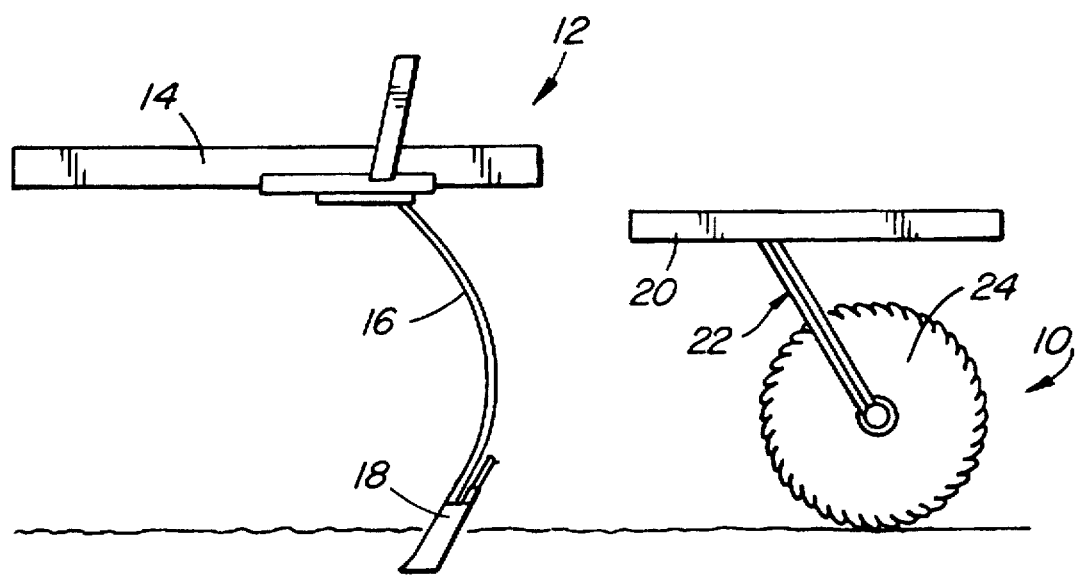
FIG. 1 shows in elevation a packer wheel being towed behind an agricultural implement such as a seed planter.

FIG. 1 shows very generally the positioning of a packer wheel assembly 10 behind a seed planting implement shown by the reference number 12. In this configuration the seed planting implement is towed behind a tractor (not shown) and includes an implement frame 14, a seeder shank 16 which extends into the soil and a seed placement device 18 for placing seed (or fertilizer) in the soil at a predetermined depth. The packer wheel assembly is physically connected to the implement 12 by any suitable means and includes a frame 20, wheel mounting means 22 and a packer wheel 24 which is used to pack the soil behind the device 18 above the planting line. The packer wheel may be spring loaded or otherwise mounted so that an adjustable vertical load may be applied thereto, the load depending on the seed being planted and the nature of the soil in which planting takes place. Usually the packer wheel is ground driven but it may be powered if required.

While this invention was developed in conjunction with and is described with reference to seed planting it should be understood that it has uses well beyond soil packing or general agricultural applications in that it can be used with any kind of rotating equipment in almost any industry. The applications for the present invention are truly universal.

Figure 2:
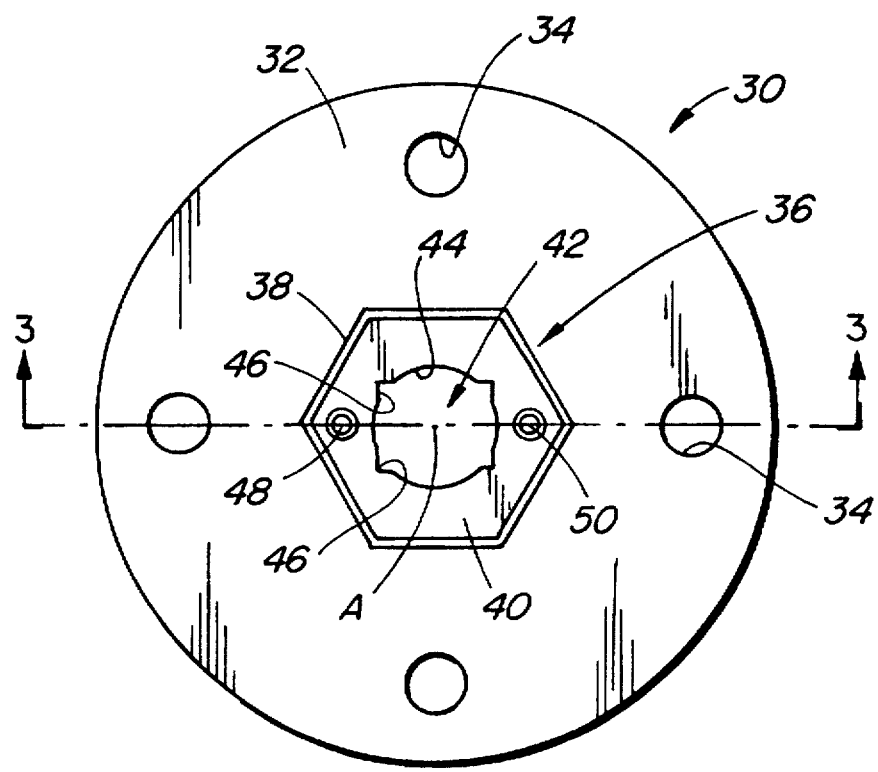
FIG. 2 shows an end view of a hub of the present invention.
Figure 3:
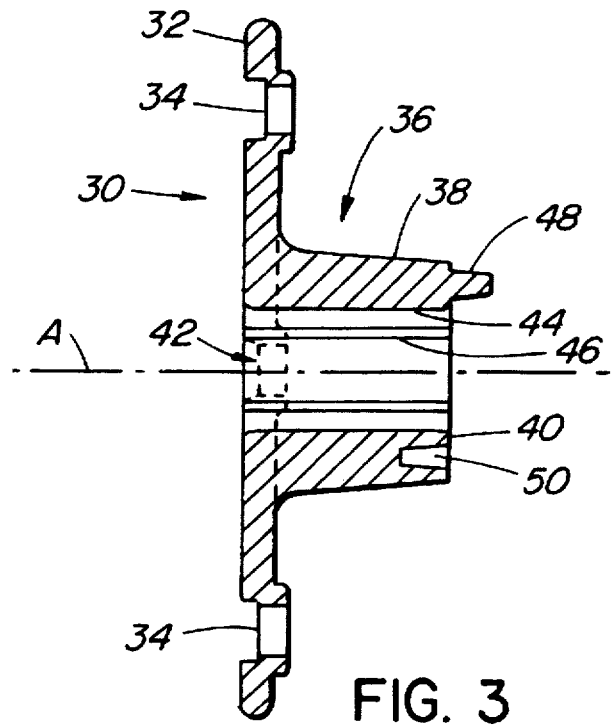
FIG. 3 shows a cross-sectional view of the hub of FIG. 2 taken on the line 3—3 thereof.

Turning now to FIGS. 2 and 3 the universal hub of this invention will now be described. The hub 30 is preferably cast from ductile iron, although it could be stamped from sheet metal or moulded from plastic materials, and it includes a flange portion 32 provided with a plurality of circumferentially spaced through bores 34 which, as seen in FIG. 3, are recessed or countersunk. A boss portion 36 projects laterally from the inner side of the flange portion and its side walls 38 converge slightly to a flat end face 40. The boss portion 36 has a non-circular, preferably polygonal, periphery defined by a plurality of the flat, circumferentially adjacent, side wall 38 angled relative to each other. For the illustrated embodiment there are six such side walls which define a hexagonal periphery for the boss portion 36.

A bore 42 extends through the hub along the axis A thereof, the bore 42 being generally cylindrical with an arcuate inner surface 44. A plurality of generally V-shaped recesses or corners 46 are cut into the surface of the bore 42 so that the bore can receive not only a cylindrical shaft but also a square or rectangular shaft, with the corners of such a shaft being received within the corners 46. A wheel carrying the hub of this invention could freely rotate on a cylindrical shaft passing through the bore 42 or it could be forced to rotate in conjunction with a square or non-circular shaft held by the corners 46 as the hub could not rotate on such a shaft.

Figure 5:
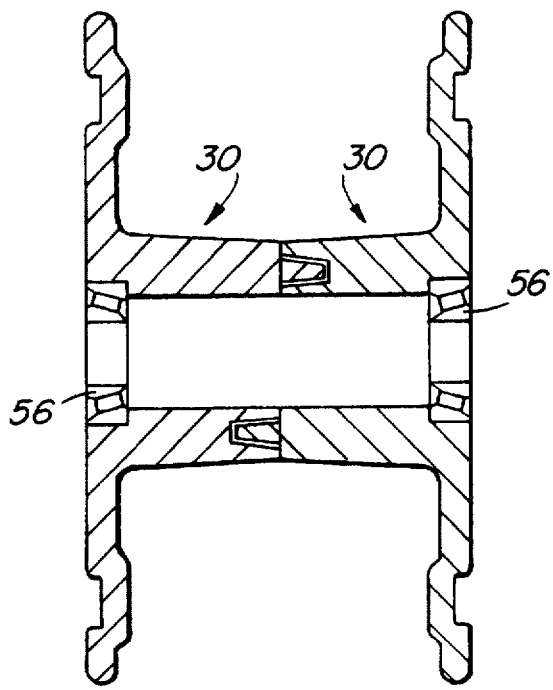
FIG. 5 shows in cross-section a configuration that accepts shaft bearing assemblies.

In particular applications in which the wheel is to operate in a "free-wheeling" mode, the bore 42 could receive an appropriate bearing assembly 56 at one, or both, ends thereof, as shown for example in FIG. 5.

At the end face 40 there are means which can be used to align or mate one hub with an oppositely oriented hub in the event that a pair of hubs is required to mount a wheel or other piece of rotating equipment. A dowel or pin 48 projects from the end face 40 and a recess or counterbore 50 extending inwardly from the end face 40 is diametrically opposed to the dowel or pin 48 and equidistant from the axis A. If two hubs are required to mount a wide wheel, for example, the pin 48 of one hub is receivable in the recess 50 of the other hub so that the two hubs are properly aligned with each other for mounting on a shaft.

Figure 4:
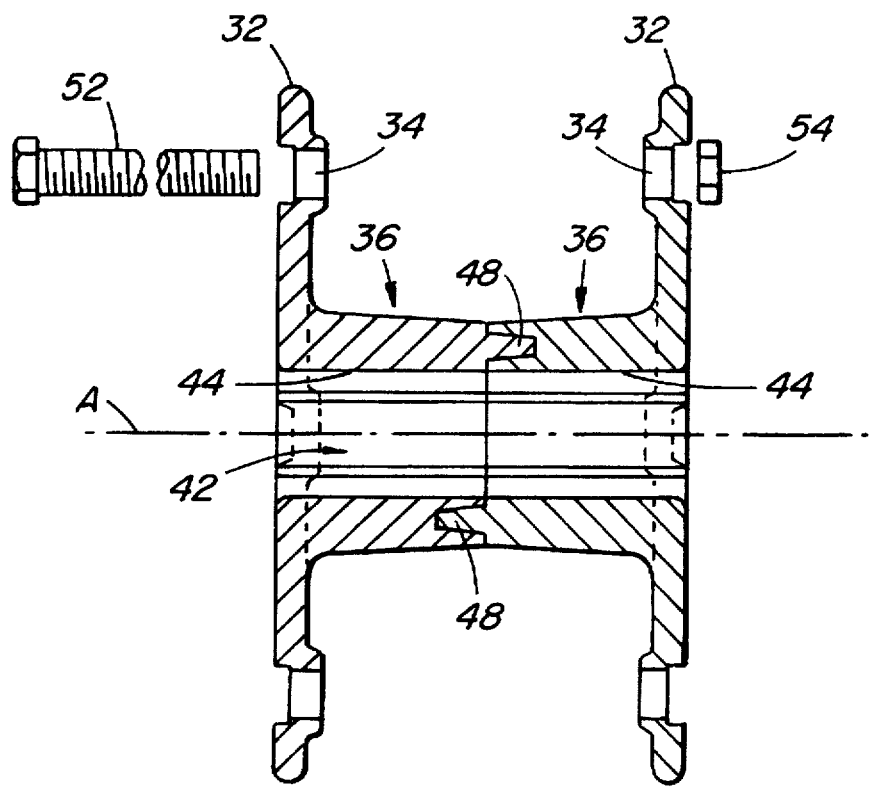
FIG. 4 shows in cross-section a pair of hubs joined together.

If two hubs are used, as shown in FIG. 4, then a bolt 52 can pass from one flange portion through the body of the wheel, from one through bore 34 to an aligned through bore 34 in the flange portion of the mating hub, to a threaded nut 54 to further secure the hubs together and to the wheel. Even though it is not necessary to secure a single hub to a wheel, due to the interlock therewith provided by the non-circular boss portion, one could still guard against relative rotation between the hub and the wheel by attaching the flange portion 32 to the wheel body by screws or bolts passing through the bores 34 into the wheel body itself.

Figure 6:
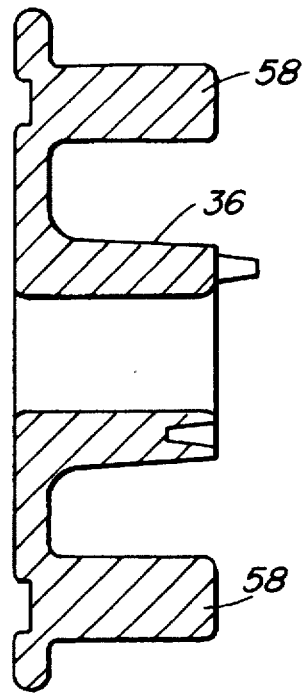
FIG. 6 shows in cross-section an alternative embodiment using a different mechanism for securing the hub to a rotatable body.

FIG. 6 illustrates yet another embodiment of this invention whereby attachment of a hub to a wheel or other body can be effected by one or more inwardly extending bosses or protrusions 58 which can be moulded or inserted into the wheel body. These bosses or protrusions would replace or complement the above-mentioned securing mechanism. Also, under low axial loading conditions the hub boss could be shaped to snap into the wheel body such that friction would hold the hub and wheel together. The surface of the hub could be finished to enhance its grip with the wheel or an adhesive could be used to secure the hub to the wheel.

Figure 7:
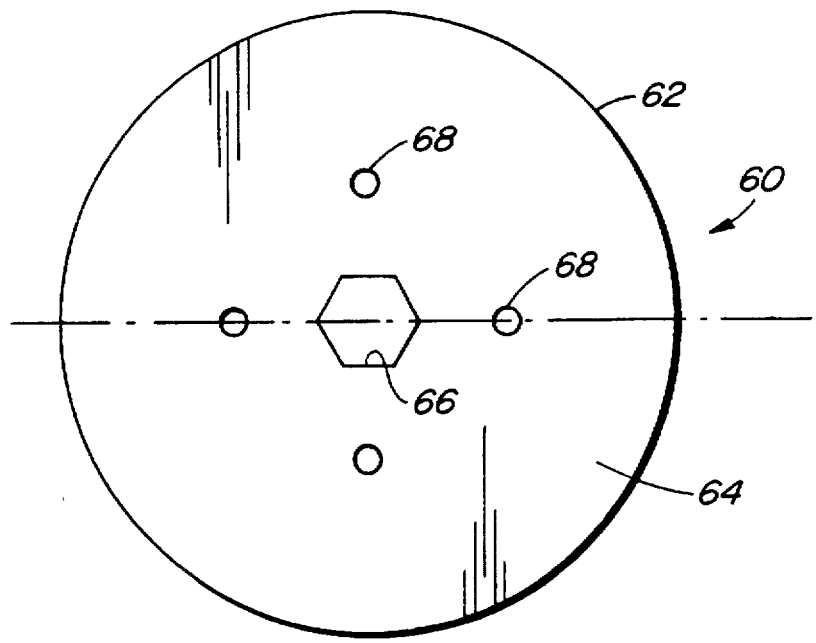
FIG. 7 illustrates generally a packer wheel that is adapted for use with the hub of this invention.

FIG. 7 illustrates in general a packer wheel 60 that is adapted for use with the hub of this invention and which could be sold as a separate item, as a replacement for a packer wheel sold originally as part of a hub/wheel assembly. The packer wheel 60 need not be the same as the original wheel and it need not come from the same manufacturer. The wheel 60 includes an outer peripheral packing wall 62, a wheel body 64, a central non-circular opening 66 adapted to receive the non-circular boss 36 of the hub, and a plurality of circumferentially spaced counterbores or through holes 68 adapted to receive bolts 52 or bosses 58. The wheel 60 could be of any of the prior art configurations or constructions as described earlier or it could be of the "active face" type as described in the copending application of Ron R. Lefebvre as previously mentioned.

The hub of the present invention offers the farmer, and anyone else using the hub, a number of advantages. The hub permits the changing of a single wheel if it is damaged in use, and if the wheel is a plastic one it can be recycled. The farmer can more readily change from one style of packer wheel to another depending on soil conditions. The flange portion of the hub transfers the load into the body of the wheel, thereby reducing wheel stresses and excessive loading at the centre of the hub. The polygonal configuration of the boss portion prevents the wheel from turning on the hub. The hubs can be used singly or in pairs depending on the size of wheel to be carried thereby and the loading to be placed on the wheel. A basic hub can be cast and then secondary machining can be effected at a later date to shape the hub to specific wheel or shaft configurations. For gang mounting the hub can accept either cylindrical or square shafts. Deflection at the centre of the wheel is minimized in comparison to assemblies which use a bearing inserted into the centre of a plastic hub. The effects of temperature and differences in the expansion coefficients of the wheel and hub materials are minimized.

The foregoing has described the preferred embodiment of the universal hub of the present invention. As indicated, it was developed primarily for agricultural packer wheels, but it is clear that it has application beyond agriculture and that with only minor modification it could be used to mount almost any piece of rotating equipment in almost any industry. A skilled workman could effect such modifications without departing from the spirit of this invention and accordingly the protection to be afforded the invention should be determined from the scope of the claims appended hereto.

I claim:

1. A hub for use with a body rotatable about an axis, comprising: a flange portion for abutment against a side wall of the body; a boss portion projecting laterally from one side of said flange portion and receivable within the body, said boss portion having a non-circular peripheral surface defined by a plurality of slightly converging, flat, circumferentially adjacent, side walls which terminate at a flat end face of said boss portion; a bore extending through said flange and boss portions along a hub axis coinciding with the axis of the body, said bore being adapted to receive shafts of different cross-sectional configurations; pin means projecting from said end face on one side of said bore; and recess means extending inwardly of said boss portion from said end face, said pin means and said recess means being diametrically opposed to each other and spaced equidistantly from said hub axis whereby a pin means and recess means of a first hub are respectively engageable with the recess means and pin means of a second hub to align the first hub with the second hub.

2. The hub of claim 1 including a plurality of circumferentially spaced bores extending through said flange portion parallel to said hub axis.

3. The hub of claim 1 including at least one boss extending inwardly from said flange portion parallel to said hub axis.

4. The hub of claim 1 wherein said bore has a generally cylindrical inner surface with a plurality of V-shaped corners formed in said surface and extending the length of said bore, said corners permitting a shaft of rectangular cross-section to be received within said bore in engagement with said corners whereby said hub is rotatable with such rectangular shaft.

5. The hub of claim 4 including a bearing assembly therein positioned at one end of said bore.

6. The hub of claim 1 including a bearing assembly therein positioned at one end of said bore.

7. A hub assembly for use with a body rotatable about an axis, comprising: first and second hub members, each having a flange portion for abutment against a respective side wall of the body, a boss portion projecting laterally from an inner side of said flange portion and receivable within the body, said boss portion having a non-circular peripheral surface, and a bore extending through said flange and boss portions along a hub axis coinciding with the axis of the body, said bore being adapted to receive shafts of different cross-sectional configurations; and means on each of said hub members for aligning said hub members with each other.

8. The hub assembly of claim 4 wherein each said boss portion peripheral surface is defined by a plurality of slightly converging, flat, circumferentially adjacent, side walls which terminate at a flat end face of said boss portion.

9. The hub assembly of claim 8 wherein said hub member aligning means includes pin means projecting from each said end face on one side of said bore and recess means extending inwardly of said boss portion from said end face, said pin means and said recess means being diametrically opposed to each other and spaced equidistantly from said hub axis whereby a pin means and recess means of said first hub member are respectively engagable with the recess means and pin means of said second hub member to align the first and second hub members.

10. The hub assembly of claim 9 including a plurality of circumferentially spaced bores extending through each said flange portion parallel to said hub axis said spaced bores being adapted to receive bolt means extendable through the body for securing said hub members together.

11. The hub of claim 10 including at least one boss extending inwardly from said flange portion parallel to said hub axis.

12. The hub assembly of claim 7 wherein each said bore has a generally cylindrical inner surface with a plurality of V-shaped corners formed in said surface and extending the length of said bore, said corners permitting a shaft of rectangular cross-section to be received within said bore in engagement with said corners whereby said hub assembly is rotatable with such rectangular shaft.

13. The hub of claim 12 including a bearing assembly therein positioned at one end of said bore.

14. The hub of claim 7 including a bearing assembly therein positioned at one end of said bore.

15. In combination: a packer wheel having a peripheral packing wall, opposing side walls, and a central non-circular opening extending from one side wall to the other side wall; and a hub assembly for mounting said wheel to a shaft, said hub assembly including first and second hub members, each having a flange portion for abutment against a respective side wall of said packer wheel, a boss portion projecting laterally from an inner side of said flange portion and having a non-circular peripheral surface receivable within said non-circular opening, and a bore extending through said flange and boss portions along a hub axis coinciding with a rotational axis of said packer wheel, said bore being adapted to receive shafts of different cross-sectional configurations; and means on each of said hub members for aligning said hub members with each other.

* * * * *